United States Patent
Lyubovsky (10) Patent No.: US 11,685,865 B2
(45) Date of Patent: Jun. 27, 2023

(54) SYSTEM AND METHOD FOR PRODUCTION OF HYDROCARBONS FROM CARBON DIOXIDE

(71) Applicant: METHYLENNIUM ENERGY CORP., Falls Church, VA (US)

(72) Inventor: Maxim Lyubovsky, Fairfax, VA (US)

(73) Assignee: METHYLENNIUM ENERGY CORP., Falls Church, VA (US)

(*) Notice: Subject to any disclaimer, the term of this patent is extended or adjusted under 35 U.S.C. 154(b) by 0 days.

(21) Appl. No.: 17/412,019

(22) Filed: Aug. 25, 2021

(65) Prior Publication Data

US 2022/0064541 A1     Mar. 3, 2022

Related U.S. Application Data

(60) Provisional application No. 63/071,367, filed on Aug. 28, 2020.

(51) Int. Cl.
| | |
|---|---|
| *C10G 2/00* | (2006.01) |
| *B01J 19/24* | (2006.01) |
| *C25B 1/04* | (2021.01) |
| *C25B 9/17* | (2021.01) |
| *B01D 3/14* | (2006.01) |
| *B01D 3/00* | (2006.01) |
| *H01M 8/0656* | (2016.01) |
| *C25B 9/65* | (2021.01) |

(52) U.S. Cl.
CPC ............... *C10G 2/50* (2013.01); *B01D 3/007* (2013.01); *B01D 3/143* (2013.01); *B01J 19/245* (2013.01); *C25B 1/04* (2013.01); *C25B 9/17* (2021.01); *C25B 9/65* (2021.01); *H01M 8/0656* (2013.01); *B01J 2219/0004* (2013.01)

(58) Field of Classification Search
CPC .............. B01J 19/245; B01J 2219/0004; B01J 2219/00045; C25B 1/04; C25B 9/17; C25B 9/65; C10G 2/50
See application file for complete search history.

(56) References Cited

U.S. PATENT DOCUMENTS

| | | |
|---|---|---|
| 4,282,187 A | 8/1981 | Corbett et al. |
| 4,927,856 A | 5/1990 | Elion |
| 5,523,326 A | 6/1996 | Dandekar et al. |
| (Continued) | | |

OTHER PUBLICATIONS

Harrison et al., "II.E.3 Renewable Electrolysis Integrated System Development and Testing," National Renewable Energy Laboratory (NREL), Golden, CO, DOE Hydrogen Program, FY 2010 Annual Progress Report, obtained from the Internet: https://www.hydrogen.energy.gov/pdfs/progress10/ii_e_3_harrison.pdf, published in 2010, 5 pages.

*Primary Examiner* — Jafar F Parsa
(74) *Attorney, Agent, or Firm* — Dorsey & Whitney LLP (57) ABSTRACT

A system and method for producing liquid hydrocarbons is disclosed. In one embodiment, the system includes at least one renewable power system configured to generate a DC electric power output; at least one water electrolysis system in electrical communication with the renewable power system and configured to utilize the DC electric power to produce a hydrogen output; and a liquid hydrocarbon synthesis system in fluid communication with the water electrolysis system and configured to utilize the hydrogen output and a carbon dioxide feed to produce a liquid hydrocarbon product.

18 Claims, 4 Drawing Sheets

(56) References Cited

U.S. PATENT DOCUMENTS

| | | |
|---|---|---|
| 7,989,507 B2 | 8/2011 | Rising |
| 8,198,338 B2 | 6/2012 | Shulenberger et al. |
| 2011/0054047 A1* | 3/2011 | Severinsky ............... C25B 1/04 |
| | | 422/186 |
| 2013/0137783 A1* | 5/2013 | Kumar ...................... C01B 3/02 |
| | | 422/621 |
| 2019/0185396 A1* | 6/2019 | Schulz .................... C25B 15/08 |

* cited by examiner

SYSTEM AND METHOD FOR PRODUCTION OF HYDROCARBONS FROM CARBON DIOXIDE

CROSS-REFERENCE TO RELATED APPLICATIONS

This application claims the benefit of priority pursuant to 35 U.S.C. § 119(e) of U.S. provisional patent application No. 63/071,367, filed 28 Aug. 2020, entitled "System and Method for Production of Hydrocarbons from Carbon Dioxide," which is hereby incorporated by reference herein in its entirety.

FIELD

The present disclosure relates to methods and systems for production of hydrocarbon fuels from captured carbon dioxide ($CO_2$) and water.

BACKGROUND

Over the past century most transportation technologies have evolved around the use of liquid hydrocarbon fuels produced primarily from fossil oil. Due to finite nature of oil reserves and rapidly increasing concentration of $CO_2$ in the atmosphere, today there is growing public concern with continuing reliance on fossil oil as a source of fuels and increasing interest in switching to use of renewable energy sources, such as solar and wind energy.

The opportunities for production of liquid hydrocarbon fuels from $CO_2$ captured from industrial sources or directly from atmosphere using renewable energy has been recognized for long time, as disclosed for example in U.S. Pat. No. 4,282,187. Yet in order to attain broad acceptance such renewable fuels have to become cost competitive with fuels produced from oil. Over the past decade the technologies needed for renewable liquid fuels production, such as production of electricity from sunlight and wind, water electrolysis and carbon capture have seen significant cost reduction, such that proper integration of these technologies can result in production of cost competitive renewable carbon-neutral fuels.

The present disclosure relates to a method for integrating these individual technologies into an efficient system producing synthetic liquid fuel. These synthetic fuels can further be converted into chemicals or plastics, thus providing long term storage for captured carbon dioxide.

BRIEF SUMMARY

In one aspect, a system for producing liquid hydrocarbons includes at least one renewable power system configured to generate a DC electric power output, at least one water electrolysis system in electrical communication with the renewable power system and configured to utilize the DC electric power to produce a hydrogen output, and a liquid hydrocarbon synthesis system in fluid communication with the water electrolysis system and configured to utilize the hydrogen output and a carbon dioxide feed to produce a liquid hydrocarbon product.

The system may also include where the renewable power system is located proximate to, and is directly electrically connected to, the water electrolysis system, and where an output current and an output voltage of DC electric power output matches an input current and an input voltage of the water electrolysis system.

The system may also include where the water electrolysis system generates hydrogen at a pressure at or above an operating pressure of the liquid hydrocarbon synthesis system. The system may also include where the carbon dioxide feed is delivered and stored at a pressure at or above the operating pressure of the liquid hydrocarbon synthesis system.

The method and system may also include where the liquid hydrocarbon synthesis system includes a synthesis reactor, and a distillation column configured to separates by-product water from the liquid hydrocarbon product.

The system may also include where the liquid hydrocarbon synthesis system is configured to produce methanol. The system may also include where the carbon dioxide is captured from an emission of a bioethanol plant. The system may also include where the carbon dioxide is captured from air. The system may also include where the synthesis reactor includes a plurality of synthesis reactors. The system may also include where the distillation column includes a plurality of distillation columns. The system may also include where at least part of a heat released by the synthesis reactor is utilized to heat the distillation column. The system may also include where at the heat is transported from the synthesis reactor to the distillation column by pressurized boiling water. The system may also include where at least a part of the by-product water is recycled to the water electrolysis system by a recycle loop. The system may also include where the molar ratio of the hydrogen output to the carbon dioxide is between 2.5 and 3.0.

The system may also be configured in such a way that the liquid hydrocarbon synthesis system can be put into a sustainable idle operating mode, where minimal amount of energy, hydrogen and CO2 are consumed during the time when the renewable power is not available.

The system may also include an energy storage device such as a battery which stores DC energy from the renewable power system when renewable power is available and supplies power to the liquid hydrocarbon synthesis system during the idle operating mode.

The system may also include where the liquid hydrocarbon synthesis system includes a hydrogen storage system and a fuel cell configured to receive hydrogen from the hydrogen storage system and to supply power to the liquid hydrocarbon synthesis system during the idle operating mode.

The system may also include where the water electrolysis system is capable of producing DC power and supplying it to the liquid hydrocarbon synthesis system when supplied with hydrogen and where the liquid hydrocarbon synthesis system includes a hydrogen storage system configured to supply hydrogen back to the water electrolysis system during the idle operating mode.

The system may also include a power generating unit which utilizes portion of the liquid hydrocarbon product to provide power to the liquid hydrocarbon synthesis system during the idle operating mode.

DETAILED DESCRIPTION

The systems and methods of the present disclosure are directed to using electrical energy, particularly electrical energy, produced by a renewable energy resource to generate liquid fuels. For example, in one embodiment, the system combines carbon dioxide with hydrogen ($H_2$) produced by a hydrogen generator such as a water electrolysis system. The hydrogen generator may be integrated with an electrical power source, such as a renewable electricity system. Synthesis of hydrocarbon fuel requires a supply of carbon dioxide, to be combined with hydrogen. Currently $CO_2$ can be captured from various industrial sources, such as power plants, cement plants, ethanol plants, etc. Generally, an electricity grid is readily available at the sites where $CO_2$ is captured and renewable electricity from the gird is expected to be used in hydrocarbon fuel production. The systems and methods of the present disclosure allow renewable energy resources to be used in remote environments, such as those without access to an electric power grid, converting renewable energy resources into more easily transportable and storable hydrocarbon fuels. Locating renewable energy systems in the areas where grid electricity is readily available typically entails building expensive electricity transmission lines to connect the grid to the renewable power sources. In order to be connected to the grid, renewable energy systems typically generate high-voltage AC power, often synchronized with the grid. Water electrolyzers typically use relatively low-voltage DC power, often on the order of hundreds of volts as opposed to thousands of volts for the grid. Most present day water electrolysis systems, though, are designed to receive power from the electricity grid, and therefore, use expensive AC/DC electricity rectifier components.

One challenge in integrating a renewable power system with a liquid hydrocarbon synthesis system is that the present day liquid hydrocarbon synthesis systems are designed to operate on a continuous basis utilizing fossil fuel feed, such as natural gas. On the other hand the renewable power is by nature intermittent and frequently may be not available for extended periods of time. The system and method of the present invention provide for storing power within the system and using it to operate the liquid hydrocarbon synthesis system on a continuous basis at the time when the renewable power is not available.

Figure 1A:
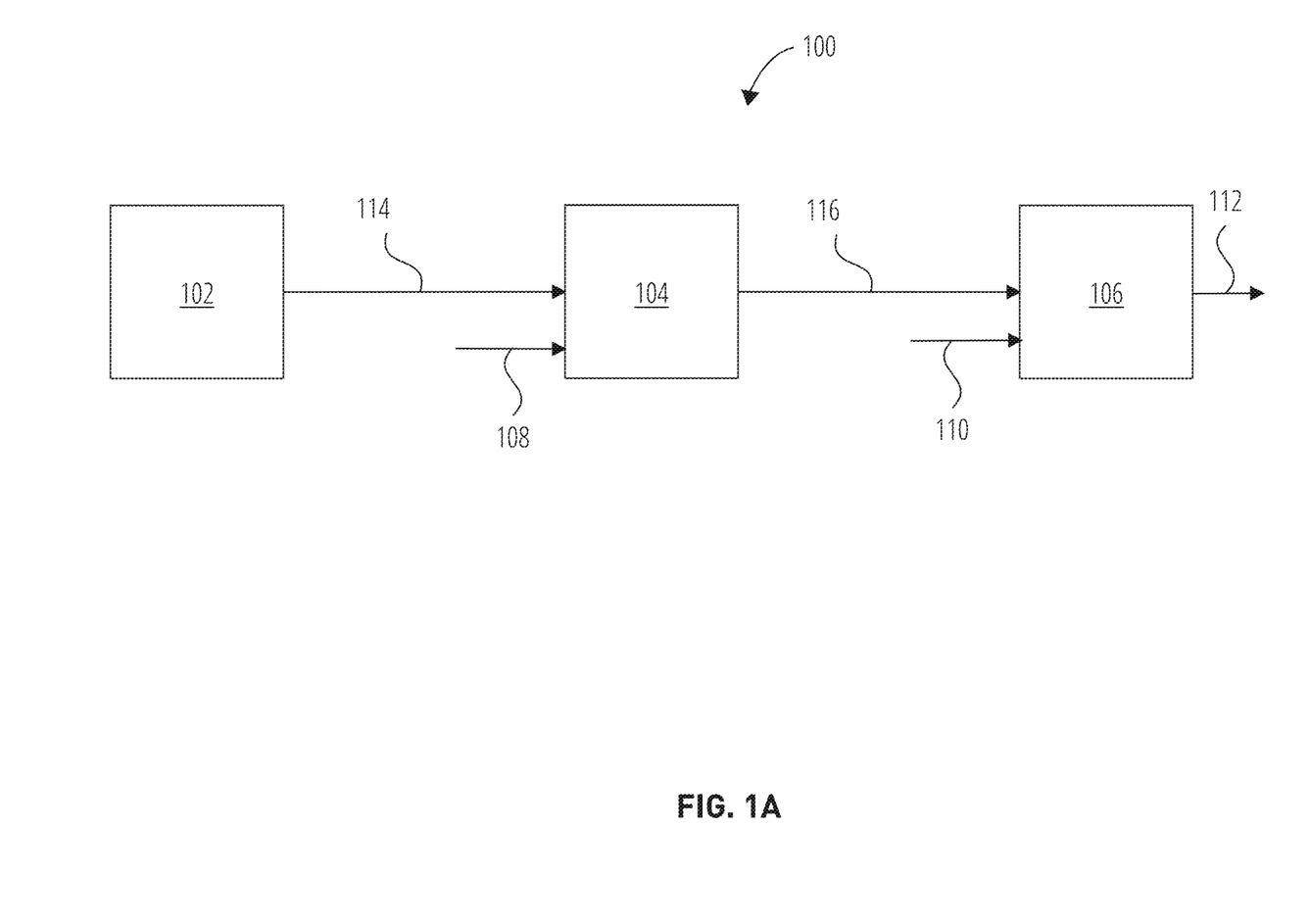
FIG. 1A is a simplified block diagram of an embodiment of a system of the present disclosure.

Referring to FIG. 1A, the system 100 and method of the present disclosure for production of liquid hydrocarbons from $CO_2$ includes three main sub-systems. The system 100 may include an electrical power source 102 that generates DC electric power output. The hydrogen generator 104 is in electrical communication with the renewable power system and utilizes the electrical power 114 to produce hydrogen output 116. The hydrocarbon synthesis system 106 is in fluidic communication with the hydrogen generator 104 and utilizes the hydrogen feed 116 in combination with CO2 feed 110 to produce liquid hydrocarbon product 112.

FIG. 1A shows an embodiment of a system 100 for producing a hydrocarbon from carbon dioxide. The system 100 may include an electrical power source 102, a hydrogen generator 104, and a hydrocarbon synthesis system 106. The electrical power source 102 is any source of electrical power and generates electrical power 114. In many embodiments, the electrical power source 102 may be a renewable power system, such as a wind turbine, a photovoltaic solar panel, geothermal generator, etc. The electrical power source 102 may generate DC electrical power 114 directly (e.g., a solar panel or wind turbine). The electrical power 114 is any electrical power that can flow between the electrical power source 102 and the hydrogen generator 104. In many embodiments, the electrical power 114 is direct current (DC), however alternating current (AC) may be provided in some embodiments. Optionally, the electrical power source 102 may provide electrical power 114 to a rectifier that converts AC to DC power. A rectifier may be associated with either the electrical power source 102, the hydrogen generator 104, or may be a separate device.

In many embodiments, the hydrogen generator 104 is a water electrolysis system, which utilizes DC electrical power 114 and a water feed 108 or water supply to split water into hydrogen 116 and oxygen. In many embodiments, the hydrocarbon synthesis system 106 system ("HC synthesis system") converts the hydrogen 116 from the hydrogen generator 104 and a carbon dioxide feed 110 into a hydrocarbon product 112. In many embodiments, the hydrocarbon product hydrocarbon products 112 is a liquid hydrocarbon. However, the hydrocarbon product 112 may be in a gaseous form at other conditions.

The electrical power source 102 can utilize any known technology which converts energy (e.g., renewable energy) into electricity, including but not limited to solar, wind, hydro, wave, geothermal, or other forms of renewable energy. The renewable energy systems may be optimized to be connected and to supply electricity to an electricity grid, such as by generating AC electricity synchronized in phase with the grid. Limited capacity of the grid and lack of cost effective electricity storage technologies often cause curtailment of the renewable power system power output at times when excess of wind or solar energy is available. The requirement to couple renewable power systems to a power grid may also limit the geographical area where such systems can be deployed. Vast areas on the face of the Earth which possess high wind, solar or other renewable energy resources, such as arctic regions, deserts, oceans, etc., are not accessible to the grid, yet may have large supplies of renewable energy resources. The systems and methods of this disclosure allow the location of renewable power systems to be detached from a power grid, allowing positioning of such systems in remote locations or other locations where such connections are impracticable or not desired. Specifically, the electrical power source 102 described herein can operate independently of a power grid, allowing deployment in any location with sufficient access to a renewable energy resource, e.g., solar, wind, etc. The renewable energy is converted via the system into a hydrocarbon (e.g., a liquid hydrocarbon), which can be readily stored and/or transported to consumers.

A hydrogen generator 104 such as a water electrolysis system utilizes DC electrical power 114 to split water feed 108 into oxygen and hydrogen 116, such as shown for example in equation 1.

$$2H_2O \rightarrow 2H_2 + O_2 \qquad (1)$$

Examines of these electrolysis systems include those offered by NEL Hydrogen, ITM Power, Giner Inc., and others.

A hydrogen generator 104 such as a water electrolysis system, uses a supply of DC electrical power 114. Many electrolysis systems are supplied by AC current from the grid and use AC/DC power converter to convert AC to DC power. Integration of a hydrogen generator 104 such as a water electrolysis system with the electrical power source 102 generating DC electrical power 114 output allows the system 100 to eliminate the AC/DC power converter, lowering system cost and complexity and increase reliability.

A water electrolysis system generally includes of a series of individual cells arranged electrically in series in a stack, with the total number of cells in a stack determining the voltage supply of the hydrogen generator 104. The voltage of each cell depends on cell current, operating pressure and temperature and is generally in the range between 1.5 and 3 V. The number of cells in the stack may be selected to match the voltage output of the electrical power source 102. Furthermore, the voltage output of the electrical power source 102 may vary depending on the supply of renewable power (e.g., solar irradiation for photovoltaic panels, wind speed for wind turbine, or the like) and the voltage of hydrogen generator 104 varies depending on the system current and these voltages may be matched for the whole range of the operating conditions. FIG. 1D shows an example polarization curve 148 with voltage 158 plotted on a vertical axis and current 160 plotted on a horizontal axis of the polarization curve 148. The polarization curve 158 shows an example of matching the voltage of a solar power source to the voltage of the electrolyzer. As shown for example in FIG. 1D, the solar power source (e.g., photovoltaic system) may exhibit one or more current-voltage I-V curves 150a-150c at different irradiation values. As the solar irradiation increases, the I-V curve for the photovoltaic power source shifts to the left (e.g., from 150a to 150b to 150c) allowing the electrolyzer operation at higher voltage and higher current along the electrolyzer polarization curve 152A as the solar irradiation increases. The conductors connecting the solar power source with the electrolyzer may exhibit a voltage drop in the wires connecting the power source 102 to the hydrogen generator 104. The voltage drop may be modeled by Ohm's law equal to I*R, where I is the system current and R is the resistance of the wires The voltage and current of the hydrogen generator 104 will be lower than the voltage of the power source 102 due to the voltage loss with the electrolyzer polarization curve shifting from 152A to 152B. Therefore, the resistance of the connecting cables may be minimized by selecting conductor cables having low resistance rating and by operating at higher voltage for a given power, thus minimizing current I and voltage loss.

In some embodiments, the hydrogen generator 104 of the present disclosure may have power rating between about 1 to 10 MW and use DC electrical power 114 supply between about 500 to 5000 V. The electrical power source 102 may match the power rating and current-voltage curve (I-V curve) of the hydrogen generator 104. The power rating between about 1 to 10 MW may correspond to modern utility-scale wind turbines, solar farms, and many other known types of renewable power systems. An electrical power 114 line connects the electrical power source 102 to the hydrogen generator 104. The power connection may utilize an electricity conductor having low resistance rating and may be a length where less than 10% of electric power produced by the electrical power source 102 is lost to resistance losses in the conductor.

A carbon dioxide feed 110 supplies $CO_2$ to the hydrocarbon synthesis system 106. In many embodiments, the carbon dioxide may be captured from a process stream such as a combustion source like a power plant. There are many different known $CO_2$ capture technologies that can be used with the system 100. The selection of $CO_2$ capture technology may be selected based on the concentration of $CO_2$ in the capture stream. The $CO_2$ capture technology commonly used to capture $CO_2$ emitted by industrial and power sources is known as amine scrubbing. More complicated technologies for directly capturing $CO_2$ from air (DAC) are now under development and also can be used with the system and method of this disclosure.

The hydrocarbon synthesis system 106 collects hydrogen 116 from the hydrogen generator 104 and combines it with the carbon dioxide feed 110 to produce the hydrocarbon product 112. The hydrocarbon product 112 may be any chemical compound having general formula $C_xH_yO_z$, which remains in liquid phase under broad range of ambient temperature and pressure conditions (e.g., in the temperature range between about −40° C. and +50° C. at 1 bar pressure). These can be different classes of chemical compounds, such as for example, alkanes, alkenes, aromatics, alcohols, aldehydes, and others, or mixtures of different compounds. The hydrocarbon product 112 can be any hydrocarbon that can be oxidized by oxygen in a combustion process such as an engine generating heat, or in an electrochemical device, such as fuel cell, generating electricity. Also, through known petrochemical processes, the hydrocarbon product 112 can be upgraded to conventional fuels and chemicals.

In some embodiments, the hydrocarbon synthesis system 106 may combine the hydrogen 116 and the carbon dioxide feed 110 to generate the hydrocarbon product 112 in one or more steps. For example, in a first step, $CO_2$ can be combined with $H_2$ in a reverse water gas shift reaction (RWGS) to produce syngas (a mixture of CO and $H_2$), a reaction for which is shown for example, in equation 2.

$$RWGS: CO_2 + H_2 \rightarrow CO + H_2O \quad (2)$$

RWGS can be followed by one or more processes to produce the hydrocarbon product 112. Examples of industrial fuel synthesis processes may be, but not limited to:

1. Fischer-Tropsch synthesis, which yields synthetic oil, a reaction for which is shown for example in equation 3.

$$CO + 2H_2 \rightarrow 1/n(CH_2)n + H_2O \quad (3)$$

2. Methanol synthesis, which produces methanol, a reaction for which is shown for example in equation 4.

$$CO + 2H_2 \rightarrow CH_3OH + H_2O \quad (4)$$

Other known hydrocarbon synthesis process can also be used with the system 100.

Alternatively or additionally, some liquid hydrocarbons can be produced in a single step by directly combining $CO_2$ and $H_2$ in a reactor or a series of reactors, such as for example methanol:

$$\text{Methanol synthesis: } CO_2 + 3H_2 \rightarrow CH_3OH + 2H_2O$$

Methanol synthesis from $CO_2$ and $H_2$ is well known in the art. For example U.S. Pat. Nos. 4,282,187 and 7,989,507 B2 teach carrying out the reaction at 50-350 bar at 250-400° C. over a Cu/ZnO based catalyst, both of which are incorporated herein by reference.

Oxygen produced by the hydrogen generator 104 can be used in a variety of applications. Examples of oxygen utilization technologies may include, but not limited to: oxycombustion to produce power from fossil fuel or biomass with $CO_2$ capture; utilization in direct air capture of $CO_2$; biomass gasification to produce liquid fuels. Alternatively, oxygen can be simply released into the atmosphere.

Figure 1B:
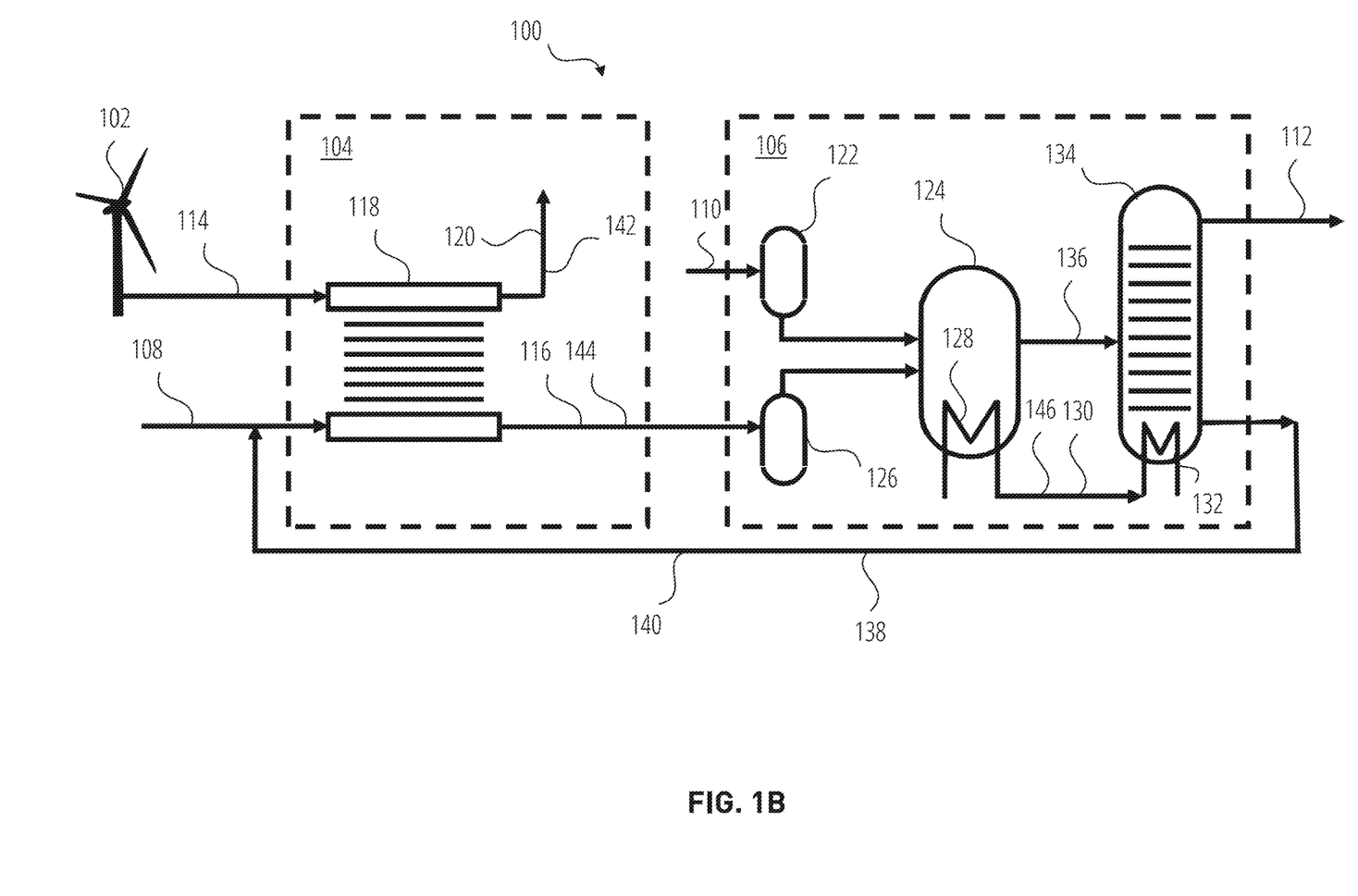
FIG. 1B is a block diagram of the system of FIG. 1A.

FIG. 1B shows a detailed view of an embodiment of the system 100. The system 100 may include: the electrical power source 102 such as a renewable DC power system, a hydrogen generator 104 such as a water electrolysis system, and a hydrocarbon synthesis system 106. The system 100 may include: an electrical power 114 connection between the electrical power source 102 and the hydrogen generator 104, a water feed 108 to the hydrogen generator 104, an electrolysis stack 118 with balance of plant components, a hydrogen conduit 144 to transmit hydrogen 116 produced by the hydrogen generator 104 to the hydrocarbon synthesis system 106, an oxygen conduit 142 suitable to carry an oxygen stream 120 produced by the electrolysis stack 118. The hydrocarbon synthesis system 106 may be supplied with a carbon dioxide feed 110, such as from a carbon dioxide capture system.

The hydrocarbon synthesis system 106 may include a carbon dioxide storage vessel 122, and a hydrogen storage vessel 126, such buffer tanks. The hydrocarbon synthesis system 106 may include a hydrocarbon synthesis reactor 124. The hydrocarbon synthesis reactor 124 takes hydrogen and carbon dioxide as feed stocks and produces a raw product stream 136. The hydrocarbon synthesis reactor 124 may include syngas recycling loop and balance of plant components. The hydrocarbon synthesis system 106 may include a hydrocarbon separation system 134 such as a fractional distillation column that separates different hydrocarbon products 112 and water 138 from the raw product stream 136 produced by the hydrocarbon synthesis reactor 124. Either or both of the hydrocarbon synthesis reactor 124 and/or hydrocarbon separation system 134 may include respective heat exchanger 128 and heat exchanger 132. The heat exchanger 128 and heat exchanger 132 may have a heat transfer media conduit 130 flowing therethrough that either add or remove heat from the respective hydrocarbon synthesis reactor 124 and/or hydrocarbon separation system 134. The hydrocarbon synthesis system 106 may include a water recycle loop 140. The water recycle loop 140 may direct water 138 produced by the hydrocarbon separation system 134 back to the water feed 108 to supply the electrolysis stack 118.

The electrical power source 102 can be any known technology which converts renewable energy (e.g., solar light, wind, geothermal, hydro, wave energy, etc) into DC electricity. Multiple renewable power systems of different types can be combined with the system 100 in order to efficiently utilize renewable power available at the particular location where the system 100 is deployed. The DC voltage generated by the electrical power source 102 may match the current-voltage (i.e., polarization or I-V curve) of the hydrogen generator 104, such as an electrolysis stack 118 of a water electrolysis system.

The electrical power source 102 may be directly connected to the hydrogen generator 104 by an electric conductor, e.g., cable or wire. This direct connection may eliminate the expensive power electronics usually used for increasing voltage of the power source 102 to the grid level and synchronizing it with the AC grid on the power source side as well as the expensive power electronics required for decreasing voltage from the grid level and converting AC to DC voltage on the hydrogen generator side of the system. Because of relatively low voltage used in the system 100, long distance transmission of DC electric power may result in resistive power losses in the electric conductor. To avoid such losses conductor cables having low resistance rating may be selected and the electrical power source 102 may be located in close proximity to the hydrogen generator 104, reducing the overall losses that may be experienced during transmission. For example, common Aluminum Conductor Steel Reinforced (ACSR) cables having resistance of about 0.0108 Ohm/kft (such as "Falcon" ACSR cable, see for example https://www.prioritywire.com/specs/ACSR.pdf) can be used to connect the power source 102 to the hydrogen generator 104. For example, a hydrogen generator 104 having power of 1 MW and the power source 102 having voltage of 1000V, the total current supplied to the hydrogen generator 104 should be about 1000 Amps. The distance between the electrical power source 102 and the hydrogen generator 104 may be limited to the length of the conductor where less than 10% of electrical power 114 produced by the electrical power source 102 is lost by resistance losses in the conductor at nominal power rating of the electrical power source 102. In the example above, if 6 cables are used in parallel, the arrangement that can fit a standard power line tower, the power losses in the cables will exceed 100 kW for the distance above 10.5 miles. Using conductor cables with lower resistance, larger number of cables or power source generating higher voltage can increase the allowable distance between the power source 102 and the hydrogen generator 104. In each particular project, the optimization can be conducted between the cost of the cables, the system voltage, and the allowable amount of energy losses in the cables to determine the maximum distance.

The hydrogen generator 104 may include water feed 108, and an electrolysis stack 118 with balance of plant components, hydrogen conduit 144 and an oxygen conduit 142. To match the DC voltage rating of the electrical power source 102 to the DC voltage of the electrolysis stack 118, the electrolysis stack 118 can be adjusted by varying the number of cells in the electrolysis stack 118. The I-V curve of the electrolysis stack 118 can also be modified by changing the cell area, which may change the current density in the cells. Therefore, the cell area and the number of cells in the electrolysis stack 118 may be selected in such a way, that the I-V curve for the electrolysis stack 118 matches the I-V curve for the electrical power source 102.

The hydrogen conduit 144 supplies the hydrogen 116 produced by the electrolysis stack 118 to the hydrocarbon synthesis system 106. In some embodiments the hydrocarbon synthesis system 106 may operate at pressure between about 30 and 300 bar. In some embodiments, electrolysis stack 118 directly produces hydrogen 116 at elevated pressure exceeding the operating pressure of the hydrocarbon synthesis system 106, so that the hydrogen conduit 144 delivers hydrogen 116 to the hydrocarbon synthesis system 106 without additional compression. Polymer electrolyte membrane (PEM) type electrolyzers that are capable of producing hydrogen at pressure as high as 350 bar can be obtained from several commercial vendors, such as NEL or Giner Inc. Other types of water electrolysis systems capable of producing hydrogen at elevated pressure exceeding the operating pressure of the hydrocarbon synthesis system 106 can also be used with the system 100.

The oxygen conduit 142 supplies oxygen stream 120 produced by the hydrogen generator 104 to any auxiliary application, which may utilize pure oxygen, or simply vents oxygen into the air.

The hydrocarbon synthesis system 106 may include: a carbon dioxide storage vessel 122; a hydrogen storage vessel 126; a hydrocarbon synthesis reactor 124 or series of reactors with or include a syngas recycle loop; a hydrocarbon separation system 134; and a heat transfer media conduit 130.

The carbon dioxide storage vessel 122 receives $CO_2$ supplied by the $CO_2$ carbon dioxide feed 110 line and may store it at a pressure at or exceeding the operating pressure of the hydrocarbon synthesis reactor 124. The carbon dioxide storage vessel 122 is in fluid communication with the hydrocarbon synthesis reactor 124 and releases measured amounts of $CO_2$ into the hydrocarbon synthesis reactor 124. Captured $CO_2$ may be supplied to the carbon dioxide storage vessel 122 by a pipeline or by rail or taker trailer shipments from industrial sources of captured $CO_2$, by a direct air capture system located in proximity of the liquid hydrocarbon production system, or by any other known source of captured $CO_2$. A readily available source of captured $CO_2$ for production of hydrocarbons may be highly concentrated $CO_2$ vent streams emitted, for example, by bioethanol plants. Captured $CO_2$ can be produced by compressing a $CO_2$ vent stream of the bioethanol plant to a pressure at or exceeding the operating pressure of the hydrocarbon synthesis reactor 124 and providing clean-up such as to remove impurities which can damage the synthesis catalyst.

The hydrogen storage vessel 126 receives hydrogen 116 produced by the hydrogen generator 104 and supplied by the hydrogen conduit 144. The hydrogen storage vessel 126 is in fluid communication with the hydrocarbon synthesis reactor 124. The hydrogen storage vessel 126 stores the hydrogen 116 at pressure at or exceeding the operating pressure of the hydrocarbon synthesis reactor 124 and releases measured amounts of hydrogen into the hydrocarbon synthesis reactor 124. The hydrogen storage vessel 126 may be equipped with water drainage system to remove liquid water which may be condensing out of the hydrogen 116 produced by the hydrogen generator 104 if the hydrogen generator 104 is not equipped with its own hydrogen dryer.

The hydrocarbon synthesis reactors 124, or plurality of reactors, may be of any known type that can combine $CO_2$ and $H_2$ to produce a hydrocarbon product 112 and water. The hydrocarbon synthesis reactor 124 operating conditions and design may be selected to maximize conversion of $CO_2$ and $H_2$ into the desired hydrocarbon product 112. For any liquid hydrocarbon synthesis process, some amount of $CO_2$ and $H_2$ may remain unreacted at the end of a series of hydrocarbon synthesis reactors 124, such as due to equilibrium conditions of the chemical reaction. As is commonly known for this type of chemical synthesis systems the liquid product and water can be separated from the gas phase and the gas is recycled to the reactor feed by the syngas recycle loop.

The raw product stream 136 produced by the hydrocarbon synthesis reactor 124 may be a liquid mixture of water and hydrocarbons. The raw product stream 136 is directed into the hydrocarbon separation system 134 which separates water and different fractions of the raw product stream 136. Any know separation technology capable of separating water from hydrocarbons can be used with the system 100. A distillation column or series of columns is a common separation technology. In a distillation technology the mixture of water and raw product stream 136 is fed into the middle of a vertical column having set of plates within, and the heat is supplied to the bottom of the column to provide continuous boiling. The feed mixture is separated based on the boiling temperatures of individual components with water collected at the bottom of the column and light hydrocarbons collected at the top of the column at different plates. Detailed design of the distillation column may be adjusted to the specifics of the processed hydrocarbons and product purity desired. In some embodiments, the water released from the bottom of the hydrocarbon separation system 134 is recycled to the water feed 108 to the hydrogen generator 104 by the water recycle loop 140.

Many processes for synthesis of liquid hydrocarbons from $CO_2$ and $H_2$ are exothermic, i.e., heat is released and removed from the reactor to keep the temperature at the desired level generally between about 200° C. and 500° C. for different synthesis processes. Any suitable device that can remove the heat of the synthesis reaction from the hydrocarbon synthesis reactor 124 may be used. In some embodiments, of the system 100, a heat transfer medium 146 may flow through a heat transfer media conduit 130 and/or one or more heat exchangers such as the heat exchanger 128 and/or the heat exchanger 132. In some examples the heat transfer medium 146 may be oil, water, molten salt, or other heat carrying media. The heat transfer medium 146 is passed through the heat exchanger 128 which is in thermal communication with the hydrocarbon synthesis reactor 124. The heat transfer medium 146 is then passed to the heat exchanger 132 where heat produced in the hydrocarbon synthesis reactor 124 is utilized in the separation process by the hydrocarbon separation system 134.

In some embodiments, the hydrocarbon synthesis system 106 is selected to produce methanol. Methanol synthesis from $CO_2$ and $H_2$ is well known in the art and is disclosed for example in U.S. Pat. Nos. 4,927,856, 5,523,326 A, 7,989,507 B2, 8,198,338 B2, which are incorporated herein by reference. Methanol synthesis reactors can generally operate at temperature between 200° C. and 250° C. Water can be used as heat transfer medium 146 between the hydrocarbon synthesis reactor 124 and the hydrocarbon separation system 134. An advantage of using water as the heat transfer medium 146 may be that by varying the pressure in the heat exchanger 128, the temperature in the synthesis reactor can be controlled. In some embodiments, of the system 100 configured to produce methanol as a hydrocarbon product 112, $H_2$ and $CO_2$ may be fed into the hydrocarbon synthesis reactor 124 in a molar ratio of about 2.5-3 $H_2$ to $CO_2$.

Due to the intermittent nature of the renewable power, such as wind or solar, the electrical power source 102 supplying power to the hydrogen generator 104 and the hydrocarbon synthesis system 106 can be frequently interrupted. Generally the hydrogen generator 104 can be started and stopped rapidly to follow the power supplied by the electrical power source 102. On the other hand the existing hydrocarbon synthesis systems are usually designed to operate on a continuous basis and frequent starting and stopping caused by power interruptions may require complicated and expensive procedures, which may include purging with inert gases, drying and cooling the reactors. Thus, traditional hydrocarbon synthesis systems are not compatible with intermittent renewable power.

The system of the present disclosure provides for installing energy storage capacity which can store energy at the times when the power source 102 is supplying power to the system and dispense power when the renewable power is not available.

The amount of energy storage installed depends on the expected lengths of the periods during which the renewable power would not be available and the amount of power consumed by the system during these periods. To reduce the size of energy storage used through the first factor, the systems of this disclosure may be deployed in a location with a high capacity of renewable energy availability to minimize the periods of time when the renewable energy in not available. To reduce the power consumption during the periods when the renewable energy in not available, the system may be turned down and enter an idle operating state.

The idle operating state of the system may be designed in a way which allows for extended stable operation of the system with minimal energy consumption and then allows for rapid ramp up to a normal operating regime when the renewable power becomes available. In the system of this disclosure, the idle operating state of the system includes stopping extraction of the hydrocarbons from the hydrocarbon synthesis system 106 by recycling process gas around syngas recycle loop of the hydrocarbon synthesis reactor 124 and by providing minimal amount of heat to the reboiler on the hydrocarbon separation system 134. The synthesis reactor and the distillation column in the idle state remain at about the nominal operating temperature, which allows rapidly restoring hydrocarbon production when the renewable power becomes available. In the idle state of the system some minimal amount of hydrogen may be supplied to the hydrocarbon synthesis reactor 124 to compensate for possible losses from the hydrocarbon synthesis reactor 124, but such supply of hydrogen should be minimized.

In one embodiment of the system 100 the battery banks may be installed to store excess DC energy from the power source 102 at the time when renewable power is available. This stored DC energy may be used to operate the hydrogen generator 104, the balance of plant components of the hydrocarbon synthesis system 106 and to provide heat to the hydrocarbon separation system 134 during the idle state of the system. At that time the hydrogen generator 104 should be turned to minimal production required for sustaining the hydrocarbon synthesis system 106 in the idle state.

In another embodiment of the system 100, the fuel cell is installed as part of the hydrocarbon synthesis system 106. During the idle operating state of the system part of hydrogen from the hydrogen storage vessel 126 may be diverted to the fuel cell to provide the power required to operate the balance of plant components of the hydrocarbon synthesis system 106 and to provide required heat to the hydrocarbon separation system 134. The remaining hydrogen continues to be supplied to the hydrocarbon synthesis system 106 at a minimal feed rate.

In yet another embodiment of the system 100, during the idle operating state, part of hydrogen from the hydrogen storage vessel 126 may be diverted back to the electrolysis stack 118. In some embodiments, the hydrogen generator is a reversible electrolyzer which can operate as fuel cell to produce DC power from stored hydrogen when power is not available or can operate in electrolyzer mode to generate hydrogen when power is available. At that time the electrolysis stack 118 operates in reverse, consuming hydrogen to generate DC power required for operation of the balance of plant components of the hydrocarbon synthesis system 106 and to provide required heat to the hydrocarbon separation system 134. The remaining hydrogen continues to be supplied to the hydrocarbon synthesis system 106 at the required minimal feed rate.

In yet another embodiment of the system 100 portion of the hydrocarbon product may be utilized during the idle state by an auxiliary power generation system to generate power used for operation of the balance of plant components of the hydrocarbon synthesis system 106 and to provide heat to the hydrocarbon separation system 134. The power may be generated through any known technology, such as an internal combustion power generator, gas turbine generator, and/or a fuel cell. The product hydrocarbon may also be supplied to the hydrocarbon synthesis system 106 at a minimal feed rate to provide the balance of the flow required for sustaining the idle operating state.

Example

Figure 1C:
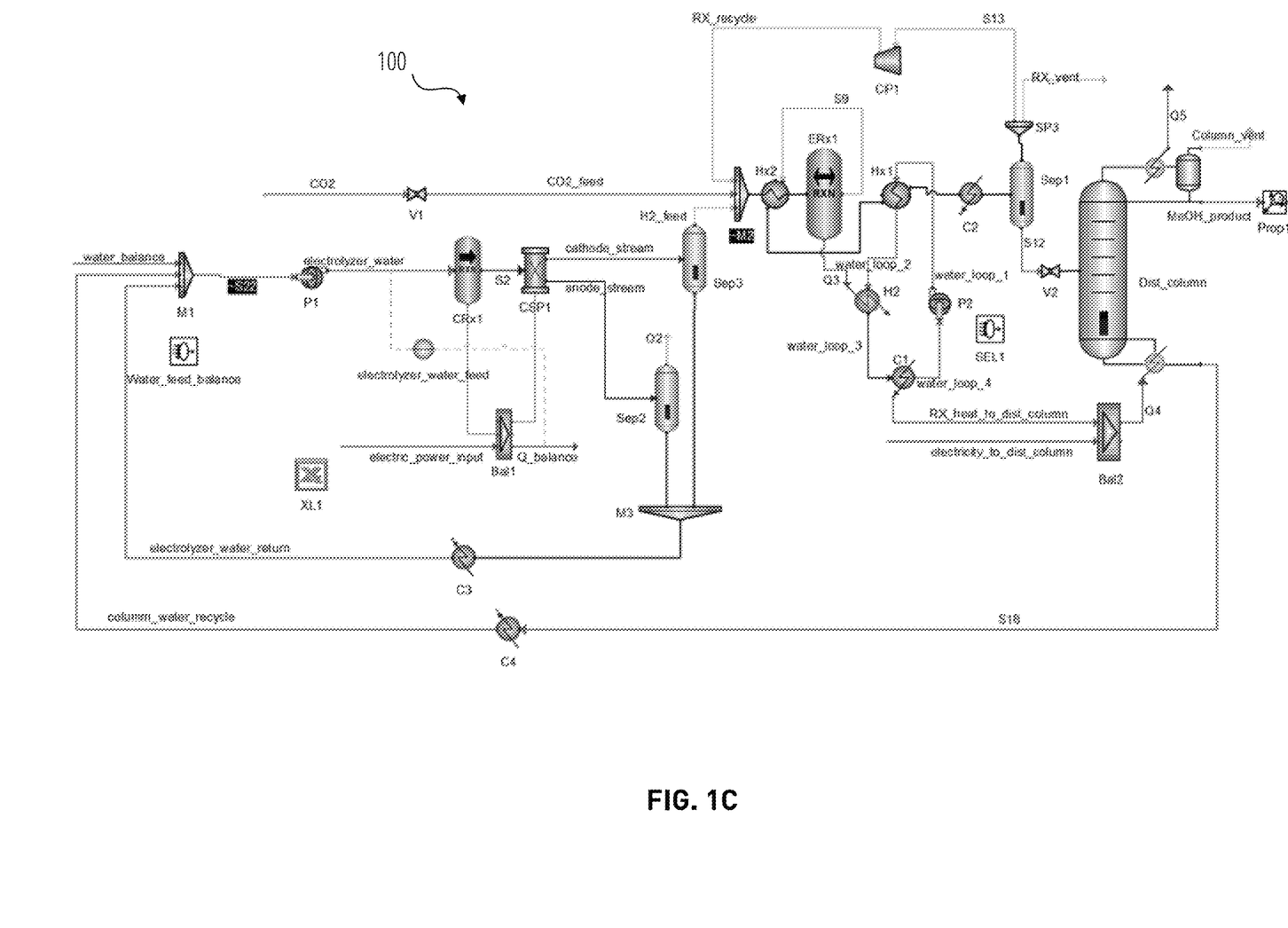
FIG. 1C is a process flow diagram of the system of FIG. 1A
Figure 1D:
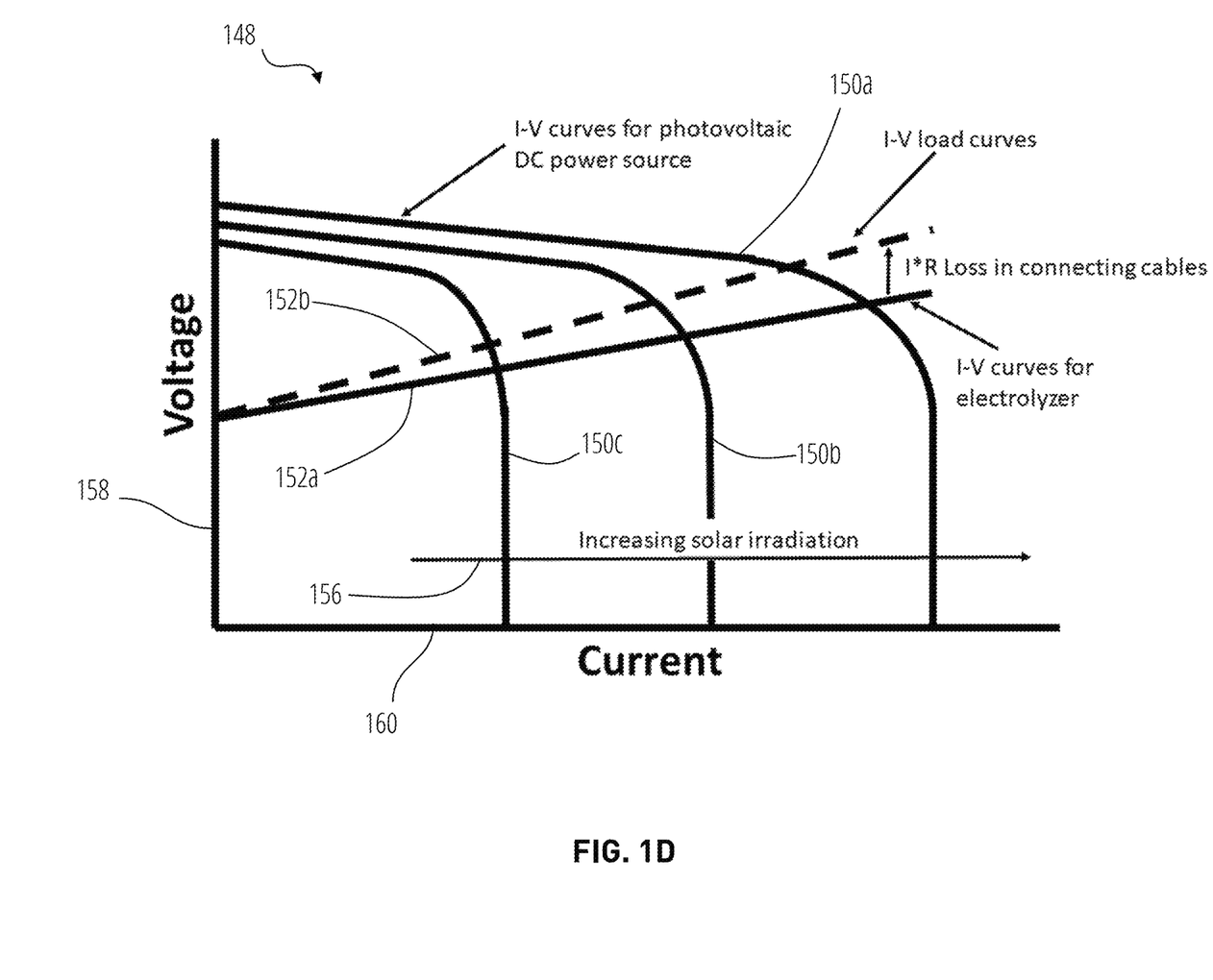
FIG. 1D is a diagram for matching an output current and an output voltage of DC electric power output with an input current and an input voltage of the water electrolysis system.

FIG. 1C shows an example embodiment of the system 100. This example shows the system 100 configured for production of methanol from $CO_2$, $H_2O$ and renewable DC electricity which was modelled using VMGSim thermodynamic modeling software, as shown in FIG. 1C. The modeled system 100 includes an electrolyzer section which uses DC power input to generate a high-pressure $H_2$ steam; a hydrocarbon synthesis reactor loop which converts $H_2$ and $CO_2$ feed into a mixture of methanol and water; and a distillation column, which separates the methanol product from the raw output of the hydrocarbon synthesis reactor. Heat removed from the synthesis reactor by a heat transfer medium such as water is utilized in heating the distillation column. Water removed from the distillation column is recycled to the electrolyzer section. Heat and water flows are balanced for each component in the system. Detailed description of each section with the assumptions used in the model is given below.

For the electrolyzer model the stack area (5000 $cm^2$) and the number of cells (500) in the stack are assumed as system parameters. In practice this stack area may be achieved by setting multiple stacks in parallel. The feed current (10,000 amp) is specified as an operation parameter, resulting in current density of 2 amp/$cm^2$. Then the stack voltage is determined based on a specified polarization curve which accounts for the stack voltage variation in response to the stack current and the hydrogen output pressure. The electric DC power consumed by the stack (10.4 MW) is then calculated as a product of stack voltage and current.

Chemically the electrolyzer is modeled as a conversion reactor which splits water into $2H_2+O_2$ to produce the amount of $H_2$ determined by the stack current (2 electrons for each $H_2$ produced). In a secondary reaction any methanol and other HC that may be present in the feed water (such as due to recycling from the distillation column) are assumed to be fully oxidized. The heat, which is the difference between the electric energy feed and the enthalpy of the reaction, is removed into the water stream. Component separator separates produced $H_2$ saturated with water at specified cathode pressure (50 bar) and enters the synthesis loop without further drying or compression. Water and $O_2$ leave at anode at set anode pressure (1.2 bar). Water feed rate is calculated to keep the temperature rise through the electrolyzer at 5° C. Oxygen is separated from anode water and vented and the water is cooled to T_in and recycled to electrolyzer feed.

The Synthesis Loop

Hydrogen is supplied to the synthesis loop at the electrolyzer exit conditions. In some embodiments, a hydrogen buffer tank may be used to provide stabilization for intermittent nature of the power source.

Carbon dioxide feed is at the same pressure as the hydrogen from a storage tank or supply line at a specified H2:$CO_2$ ratio of about 2.85. Some $CO_2$ may be dissolved in the methanol/water product leaving the synthesis loop and is removed in the distillation column. In this example, the carbon efficiency is 93%. Hydrogen and carbon dioxide feed are mixed with recycled flow, the mixture passes through the in/out heat exchange and feeds to the synthesis reactor. The reactor is modeled as a Gibbs equilibrium reactor at T=200° C. The exit stream from the reactor is cooled to ambient temperature (e.g., about 15° C.) then the liquid fraction (e.g., a mixture of methanol and water with saturated dissolved $CO_2$) is separated, while the gas fraction is recycled (about 0.1% of the recycle gas may be vented to allow material balance in the recycling loop). The heat of the synthesis reactor is removed into the cooling water loop where water is circulated at a pressure of about ~1500 kPa corresponding to about 200° C. saturation temperature, so that boiling water removes the reactor heat. Adjusting the water loop pressure may allow controlling the reactor temperature.

The Distillation Column

The distillation column is modeled as a 12-stage column with a reflux ratio set at 2.0 and the fraction of methanol in the reboiler water specified at 1%. The liquid fraction from the synthesis reactor loop drops pressure to ambient and is supplied to the distillation column at stage 6.

Boiling water from the synthesis reactor cooling loop (at a temperature of about 200° C.) is passed through the column reboiler providing heat to the column. Additional heat for column operation may be supplied by electric power.

The product is removed from the top stage and may be cooled to about 20° C. and condensed into liquid. Product stream may be about 98.4 wt. % methanol, 0.6 wt. % water, 1.0 wt. % $CO_2$. Water from the reboiler is recycled back to the electrolyzer feed.

Results Summary

The table below shows the feeds and products for this example of the system 100, based on the VMGSim model. The total power feed combines the power input for the electrolyzer (10.4 MW) and the power for heating the distillation column (0.65 MW). Electrolyzer efficiency is about 55.5 kWh/kg$H_2$. Such efficiency may be achieved for example when using a high current density and producing high hydrogen output pressure. Water feed is the makeup water supplied to the electrolyzer in addition to the water recycled from the distillation column bottom. The methanol production is the liquid product stream collected from the top of the distillation column.

Process energy efficiency may be determined as a ratio of the lower heating value of the product stream to the total electric power feed. In addition, carbon efficiency is determined as a ratio of carbon in the methanol in the product to $CO_2$ feed. The carbon efficiency under the selected operating conditions is about 93%.

|  | Example results of a VMGSIM model |
| --- | --- |
| Total power feed | 11.1 MW |
| Required water feed | 1410 Kg/hr |
| $CO_2$ consumption | 1440 Kg/hr |
| $H_2$ production | 188 Kg/hr |
| Electrolyzer power feed | 10.4 MW |
| Electrolyzer efficiency | 55.47 kWh/kg_H2 |
| Methanol production | 990 Kg/hr |

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A system for producing a liquid hydrocarbon comprising:
at least one renewable power system configured to convert renewable energy into a direct current ("DC") electric power output;
at least one water electrolysis system located proximate to and in direct electrical communication with the DC electric power output of the renewable power system and configured to utilize the DC electric power output to produce a hydrogen output; and a liquid hydrocarbon synthesis system in fluid communication with the water electrolysis system and configured to utilize the hydrogen output and a carbon dioxide feed to produce a liquid hydrocarbon product, wherein:

the system is configured to stop production of the hydrogen output by the electrolysis system, set the liquid hydrocarbon synthesis system to operate in an idle operating mode, and comprises an energy storage system to provide a minimal amount of electric power to the liquid hydrocarbon synthesis system when the DC electric power output is not available from the renewable power system.

2. The system of claim 1, wherein an output current and an output voltage of DC electric power output matches an input current and an input voltage of the water electrolysis system.

3. The system of claim 1, wherein the water electrolysis system generates hydrogen at a pressure at or above an operating pressure of the liquid hydrocarbon synthesis system.

4. The system of claim 1, wherein the carbon dioxide feed is delivered and stored at a pressure at or above an operating pressure of the liquid hydrocarbon synthesis system.

5. The method and system of claim 1, wherein the liquid hydrocarbon synthesis system comprises:

a synthesis reactor; and a distillation column configured to separate a by-product water from the liquid hydrocarbon product.

6. The system of claim 5, wherein the synthesis reactor comprises a plurality of synthesis reactors.

7. The system of claim 5, wherein the distillation column comprises a plurality of distillation columns.

8. The system of claim 5, wherein at least part of a heat released by the synthesis reactor is utilized to heat the distillation column.

9. The system of claim 8, wherein the heat is transported from the synthesis reactor to the distillation column by pressurized boiling water.

10. The system of claim 5, wherein at least a part of the by-product water is recycled to the water electrolysis system by a recycle loop.

11. The system of claim 1, wherein the liquid hydrocarbon synthesis system is configured to produce methanol.

12. The system of claim 11, wherein a molar ratio of the hydrogen output to the carbon dioxide feed is between 2.5 and 3.0.

13. The system of claim 1, wherein the carbon dioxide feed is captured from an emission of a bioethanol plant.

14. The system of claim 1, wherein the carbon dioxide feed is captured from air.

15. The system of claim 1, wherein the energy storage system comprises at least one battery configured to store the DC electric power output from the renewable power system.

16. The system of claim 1, wherein the liquid hydrocarbon synthesis system includes:

at least one hydrogen storage system;

at least one fuel cell configured to receive hydrogen from the hydrogen storage system and supply power to the liquid hydrocarbon synthesis system to sustain the liquid hydrocarbon synthesis system in the idle operating mode.

17. The system of claim 1, wherein the hydrogen storage system is configured to supply hydrogen to the at least one water electrolysis system; and the at least one water electrolysis system is configured to produce power output when supplied with hydrogen from the hydrogen storage system and to supply power to the liquid hydrocarbon synthesis system to sustain the liquid hydrocarbon synthesis system in the idle operating mode.

18. The system of claim 1, wherein the liquid hydrocarbon synthesis system further comprises a power generating unit capable of consuming a portion of liquid hydrocarbon product to produce power and to supply the produced power to the liquid hydrocarbon synthesis system to sustain the liquid hydrocarbon synthesis system in the idle operating mode.

\* \* \* \* \*